US006812665B2

(12) United States Patent
Gan et al.

(10) Patent No.: US 6,812,665 B2
(45) Date of Patent: Nov. 2, 2004

(54) IN-PROCESS RELATIVE ROBOT WORKCELL CALIBRATION

(75) Inventors: Zhongxue Gan, Windsor, CT (US); Yunquan Sun, Storrs, CT (US); Qing Tang, East Granby, CT (US)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/126,988

(22) Filed: Apr. 19, 2002

(65) Prior Publication Data

US 2003/0200042 A1 Oct. 23, 2003

(51) Int. Cl.[7] .................. G05B 19/19; G06F 19/00
(52) U.S. Cl. .................. 318/568.11; 318/568.17; 318/568.21; 700/245
(58) Field of Search .................. 318/567, 568.1, 318/568.11, 568.16, 568.21, 567.17, 567.19, 568.12; 700/186, 160, 245, 264; 73/866.5

(56) References Cited

U.S. PATENT DOCUMENTS

| | | | |
|---|---|---|---|
| 4,590,578 A | | 5/1986 | Barto, Jr. et al. |
| 4,771,222 A | * | 9/1988 | Nakashima et al. ........ 318/572 |
| 5,194,792 A | * | 3/1993 | Hara ..................... 318/568.13 |
| 5,341,458 A | * | 8/1994 | Kaneko et al. ............. 700/245 |
| 5,373,221 A | * | 12/1994 | McGee et al. ......... 318/568.11 |
| 5,457,367 A | | 10/1995 | Thorne |
| 5,528,116 A | | 6/1996 | Snell |
| 5,751,610 A | | 5/1998 | Gan et al. |
| 5,834,645 A | * | 11/1998 | Bartels et al. ................ 73/105 |
| 5,838,882 A | | 11/1998 | Gan et al. |
| 5,878,151 A | | 3/1999 | Tang et al. |
| 5,880,956 A | | 3/1999 | Graf |
| 5,910,719 A | | 6/1999 | Thorne |
| 5,929,584 A | * | 7/1999 | Gunnarsson et al. ... 318/568.16 |
| 6,044,308 A | * | 3/2000 | Huissoon ..................... 700/166 |
| 6,157,873 A | * | 12/2000 | DeCamp et al. ............. 700/253 |
| 6,382,012 B2 | * | 5/2002 | Hara et al. .................... 73/1.15 |
| 2001/0053204 A1 | | 12/2001 | Navab et al. |
| 2002/0013675 A1 | | 1/2002 | Knoll et al. |

FOREIGN PATENT DOCUMENTS

JP 02210504 A * 8/1990 ........... G05B/19/18

OTHER PUBLICATIONS

Kinematic Calibration and Geometrical Parameter Identification for Robots, IEEE Transactions on Robots and Automation, vol. 7, No. 6, Dec. 1991, pp. 721–732.
Modeling Closed–Loop Mechanisms in Robots for Purposes of Calibration, IEEE Transactions on Robots and Automation, vol. 13, No. 2, Apr. 1997, pp. 218–229.
Robotic Stiffness Control and Calibration as Applied to Human Grasping Tasks, IEEE Transactions on Robots and Automation, vol. 13, No. 4, Aug. 1997, pp. 557,–566.
Computer Vision Assisted Virtual Reality Calibration, IEEE Transactions on Robots and Automation, vol. 15, No. 3, Jun. 1999, pp. 450–464.
Robot Calibration and Compensation, IEEE Transactions on Robots and Automation, vol. 4, No. 6, Dec. 1988, pp. 643–655.
A New Technique for Fully Autonomous and Efficient 3D Robotics Hand/Eye Calibration, IEEE Transactions on Robots and Automation, vol. 5, No. 3, Jun. 1989, pp. 345–358.
A Technique to Calibrate Industrial Robots with Experimental Verification, IEEE Transactions on Robots and Automation, vol. 6, No. 1, Feb. 1990, pp. 20–30.

* cited by examiner

*Primary Examiner*—Randy W. Gibson
*Assistant Examiner*—Eduardo Colon Santana
(74) *Attorney, Agent, or Firm*—Venable LLP; Eric J. Franklin

(57) ABSTRACT

A relative calibration system and method for robot workcell calibration is capable of correcting errors between the robot tool center point (TCP) and the work-object frame according to a relative reference, in that a precision path will be created based on this calibrated workcell.

10 Claims, 11 Drawing Sheets

IN-PROCESS RELATIVE ROBOT WORKCELL CALIBRATION

FIELD OF THE INVENTION

This invention relates generally to a system and method for calibrating a virtual robot tool center point (TCP) or virtual work-object frame and more particularly to the use of relative measurement to perform in-process workcell calibration.

BACKGROUND OF THE INVENTION

Industry is now seeing a dramatic increase in robot simulation and off-line programming. In order to use off-line programming effectively, the simulated workcell has to be identical to the real workcell. This requires a more efficient and accurate method for robot calibration. By making use of calibration, the simulated robot workcell will clone the real workcell in a simulation model, so that the off-line generated robot program from a simulated workcell will be accurate enough and can be directly downloaded to a real robot controller to drive the real robot with maximum accuracy and without further modification.

A variety of attempts to develop a better robot calibration system and method to improve robot accuracy exist in the prior art. Currently used techniques, however, are typically tedious, time consuming and expensive. This is because most of the prior art calibration methodology so far is based on absolute calibration.

"Absolute calibration" refers to the method by which an external coordinate measurement system is utilized to measure the absolute position, often referred to as a global coordinate system. Since the external system measures the coordinates of a point in the workspace, the absolute method can validate any path accuracy. However, absolute position measurement has many drawbacks including the fact that it is time consuming, expensive and sometimes fails to meet accuracy requirements. One example in the prior art is to use an optical coordinate measurement system (OCMS) to calibrate the robotic workcell, which is a very expensive and time-consuming way of calibrating the robot.

In contrast to absolute calibration, some development has been made in the area of "relative calibration". Relative calibration is a method in which a standard reference target is used as the precision reference for the correction of robot kinematic error. This "standard reference" provides high-precision relative geometric quantities such as length, circularity and linearity. A standard reference could simply be a bar, a cube, a cylinder, or a ball. During the calibration, the robot is driven to make the tool center point (TCP) follow the geometry of the selected standard reference. This standard reference therefore provides a constraint on the TCP process. Due to the kinematic error, this constraint would be violated if the nominal kinematic model were used to calculate the Cartesian coordinates from the same joint angles. Minimization of the constraint violation (constraint error) will give the values of error parameters. In the present invention, this standard is called "relative reference."

However, all known relative calibration techniques are only for one component calibration. There is no relative calibration technique to deal with the overall workcell calibration. Accordingly there is a need for an economical calibration method and apparatus to deal with overall workcell calibration.

Moreover, the tool center point (TCP) may change due to tool wear or tool changes. The workpiece itself can introduce a significant amount of error or uncertainty due to workpiece variation or deflection during the manufacturing process. Real time calibration for each workpiece can eliminate this effect. Accordingly, there is a need to develop a method and apparatus, which must be cost effective and capable of in-process operation and real-time implementation.

SUMMARY OF THE INVENTION

In order to overcome the shortcomings and drawbacks of conventional calibration systems and methods to make calibration cost-effective, efficient and easy to use, the objective of the present invention is to create a novel method and device for robotic workcell calibration. The present invention will provide an economical, robust calibration system that will have the ability to calibrate the major considerations involved in any robot system including calibration on a real-time basis during manufacturing processes.

Generally speaking, there are two types of setups in robotic workcells. One consists of the robot holding the tool and workpiece being fixed on the worktable. This is called "Moving TCP". The other type consists of the robot holding the workpiece and the tool is fixed on the floor. This is called "Fixed TCP".

In a fixed TCP-based robotic workcell, the forward kinematic chain includes the robot (robot based coordinate), the gripper (work-object coordinate) and the workpiece (object coordinate); the backward kinematic chain includes the tooling system (tool coordinate). In an ideal case, the errors of real or virtual contact points between the tooling and the object are zeros along the working path.

All of the errors from the two kinematic chains can be divided in two parts: "forward chain error" and "backward chain error". Forward chain error includes the robot error, the gripper-setup error, and the object-installation error. Backward chain error includes tool-table error and tooling fixture error. The role of calibration is to eliminate or correct all of these errors in order to create highly accurate paths for robot operation. The same principle applies to a moving TCP-based robotic workcell.

In a conventional absolute calibration environment, the goal is to calibrate all the components related to a global absolute reference, in order to eliminate all of these errors separately. Absolute workcell calibration includes robot TCP calibration, tooling calibration and work-object coordinate calibration, wherein each is performed individually. Each calibration process will measure all the Cartesian coordinates to determine the error between the nominal and true value.

Unlike conventional absolute calibration methods, the relative calibration method of the present invention treats all of the errors as relative error between the tooling and the working object compared to a relative reference. Measuring this relative error and finding a way to correct this error is a major advantage of this invention. As long as the relative error is eliminated compared to the relative reference, the workcell is calibrated related to the relative reference and the perfect path will be generated.

Prior to beginning the relative calibration, a computer aided design (CAD) model of the workpiece is downloaded into a data collection and computing device such as a programmable controller or computer.

There are five steps for completing the relative calibration.

The first step is tool center point (TCP) calibration. This consists of performing a TCP calibration using the robot as a measurement tool. The calibration is accomplished by mounting a calibration target within the workcell and in a position that the robot can reach from various orientations. The calibration target can be a sphere, cylinder, cubic or any other definable geometric shape. The robot is programmed to touch the calibration target surface from various angles with a CMM touch probe. All contact positions are recorded. The TCP is calculated from the measurements using a non-linear least squares optimization algorithm.

The second step is to set up a relative reference between the robot and a sample-working object. The relative reference is established by having the robot hold a finished sample of the working object (workpiece) while a series of measurements is performed to compensate for the error between the perfect CAD model and the finished sample to obtain a relative reference. When the actual implementation of the relative method is considered, the enforcement of TCP to follow the standard geometry becomes the biggest concern since the achievable accuracy of a "standard reference" can be very high with moderate manufacturing cost. This compensation process will make the standard reference in a cost-effective way. The actual TCP path becomes the equivalent reference when the enforcement error is treated as the reference geometric error. As a result, the relative reference is the perfect CAD model of the workpiece superposed by all of the system errors from the robot.

In the third step, the robot will hold a raw or unfinished workpiece and the measurement of the raw workpiece will generate a relative error map compared with relative reference set up in the second step.

In the fourth step, an error compensation matrix to calibrate the work-object coordinate, called virtual work-object coordinate, will be calculated based on the relative error map obtained in the third step. An iterative nonlinear optimization algorithm is employed to obtain this error compensation matrix.

In the last step, tooling system calibration will be performed. In the previous steps, the tooling system has not been involved because the calibration station simulates the role of the tooling system. After finishing the calibration of the virtual work-object coordinate in the calibration station, the robot is moved to touch the tooling system and obtain the residual error between the tooling system and the calibration sensor in the calibration station. Compensation of this error into the fixed TCP will complete the tooling system calibration so that the overall workcell calibration process will be completed.

These five steps complete the workcell calibration offline. The subsequent online calibration requires only two steps from those five steps. The first is taking relative measurements of a workpiece utilizing the robot and calibration station. The second step is calculating a new, updated error compensation matrix for the virtual work-object coordinate. These two steps can be performed in real-time and in process.

It will be observed that the fundamental difference between the prior-art absolute calibration processes and the present invention is that the present invention separates the manipulator error and non-manipulator errors by utilizing a relative reference and relative compensation matrix. All of the manipulator errors are assigned to a relative reference while the rest of the non-manipulator errors are dealt with by the virtual work-object coordinate in this process.

It is an object of this invention is to develop a relative calibration method and apparatus to perform in-process calibration on the working factory floor.

It is an object of this invention to provide a method to separate the manipulator error from the non-manipulator installation errors. In this way, a straightforward linear calibration can be implemented in process.

It is an object of this invention to provide a relative reference for relative error measurement. By using this relative reference, a cost-effective high precision measurement tool can be easily utilized.

It is another object of the invention to provide a relative measurement system to measure relative error.

It is another object of this invention to provide an algorithm to calculate the parameters of a virtual work-object coordinate matrix.

Finally, it is an object of the invention to provide a means for in-process implementation of the relative calibration.

In order to implement this method, the corresponding relative calibration system must be integrated in the robotic workcell. The relative calibration system used in this invention includes a robotic workcell including a robot having an end effector. The end effector further includes a gripper for gripping the workpiece. A new substation is added to the conventional robotic workcell, called a calibration station. A sensor for measuring the relative error between a workpiece and the relative reference is located in the calibration station. Within the calibration station there is also at least one calibration sample or calibration target. In addition, a finished workpiece known to be within allowable tolerance requirements is located within the station. A data collection device for recording the output of the sensor and performing calculations is also integrated into the workcell.

The sensor can be a non-contact or contact type linear displacement gauge. A preferred sensor used in the system is a non-contact optical displacement tool. The sensor consists of a diode laser pointer and a linear charge couple device (CCD).

A contact mechanical measurement device could be a linear variable differential transformer (LVDT). The LVDT is basically a series of inductors in a hollow cylindrical shaft and a solid cylindrical core. The LVDT produces an electrical output proportional to the position of the core.

DETAILED DESCRIPTION

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims. In this section, the blade grinding is chosen as an example to describe the detail of methods and apparatus of this invention.

Figure 1:
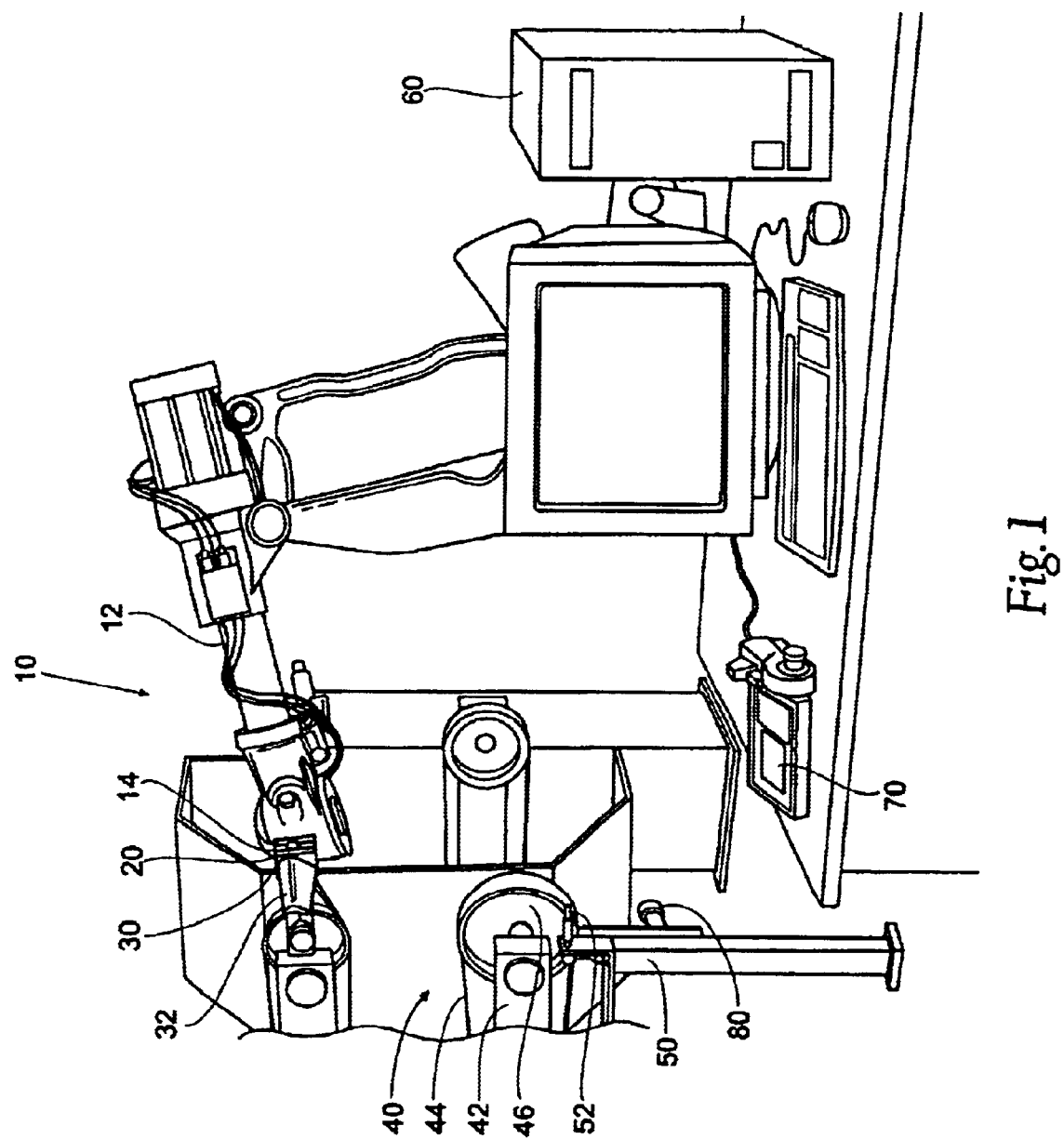
FIG. 1 is a perspective view of a robotic grinding workcell and workpiece calibration device.
Figure 2:
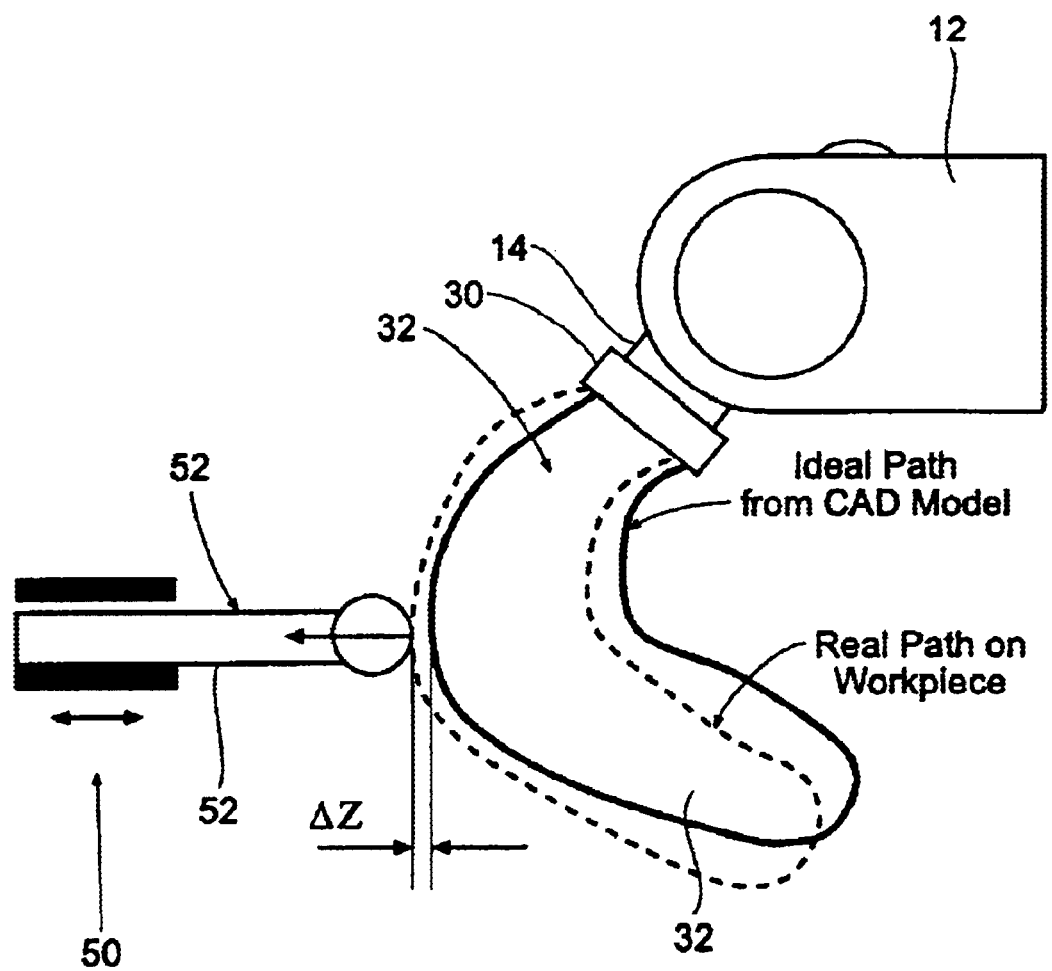
FIG. 2 is a schematic view of the robot, gripper, workpiece and a linear displacement sensor.
Figure 3:
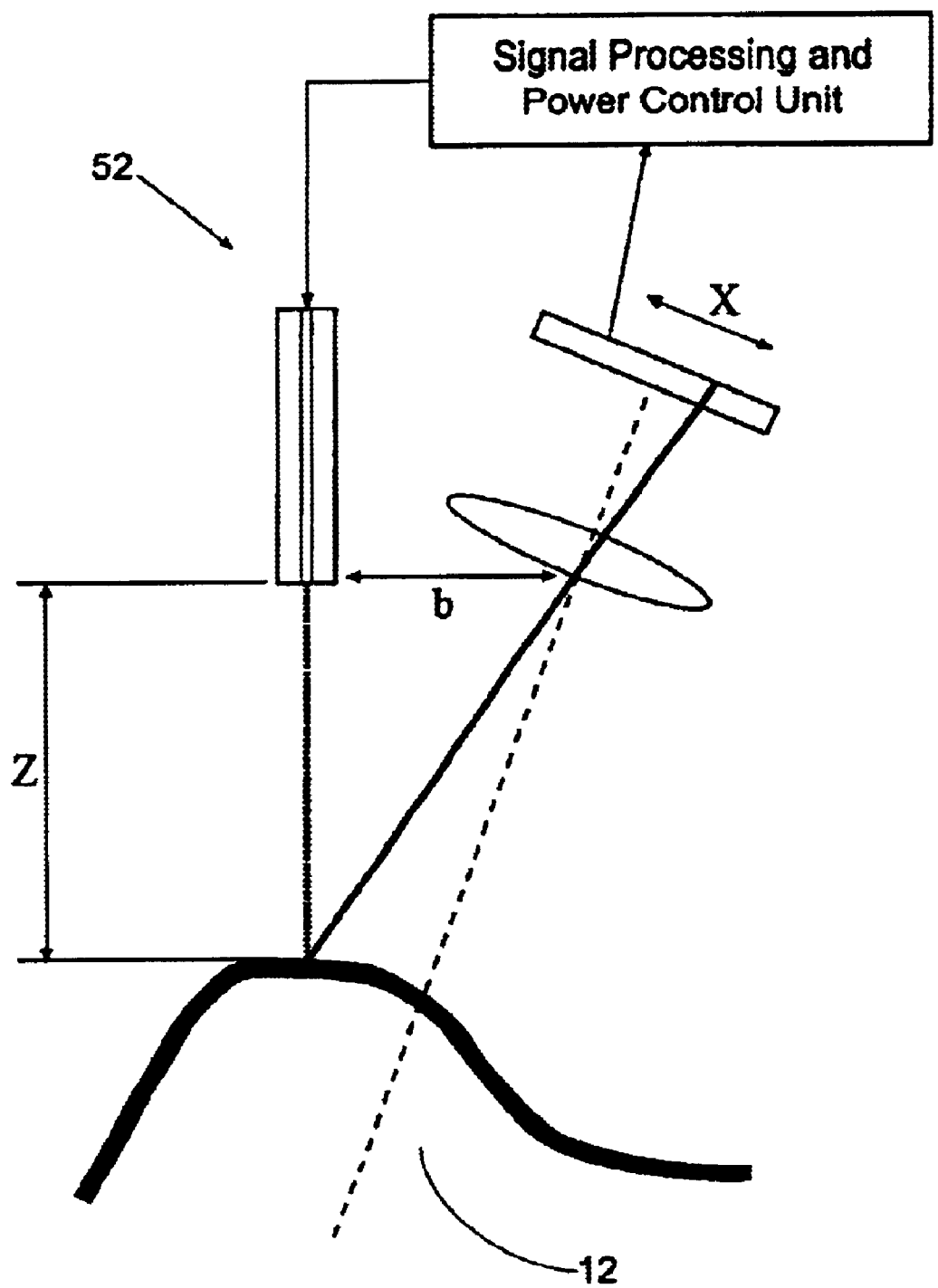
FIG. 3 is a schematic view of the robot, gripper, workpiece and a non-contacting linear CCD sensor.

FIG. 1 shows an exemplary mechanical setup for a robotic grinding workcell and work-object coordinate calibration device, generally referred to at reference numeral 10. The overall workcell is composed of a robot 12, which is represented as a robot base coordinate system optionally a force sensor 20, for sensing three directional forces and torques may be mounted on the robot mounting plate 14. The workcell further includes a gripper 30 mounted on the mounting plate or force sensor that holds a workpiece 32. Also included is a tooling system 40 such as a belt grinder 42 in which the belt 44 is supported by a contact wheel 46. Also within the workcell is a calibration station 50, in which includes a DB-G high accuracy and high resolution with 25 mm traveling range linear gauge 52. The contact linear displacement sensor 52, robot arm, gripper 30 and workpiece 32 are shown in FIG. 2. Preferably and as shown in FIG. 3, a non-contact sensor or gage 54, such as a laser diode pointer and a linear charge coupled device (CCD) can be utilized. Non-contact sensors of this type are known in the art and generally function by directing a laser beam of light toward the workpiece. The light beam is reflected and into a lens of on the sensor which then calculates the distance from the sensor to the workpiece 32 or other object. Mounting the contact or non-contact linear gauge 52/54 close to the work zone will increase the calibration accuracy. The workcell also includes a computer 60, which stores a computer aid design (CAD) model of the selected workpiece, generates the robot program by off-line robot programming software and downloads the program into the robot controller 70. As will be discussed below, the workcell further includes a calibration target 80, such as a sphere.

Figure 4:
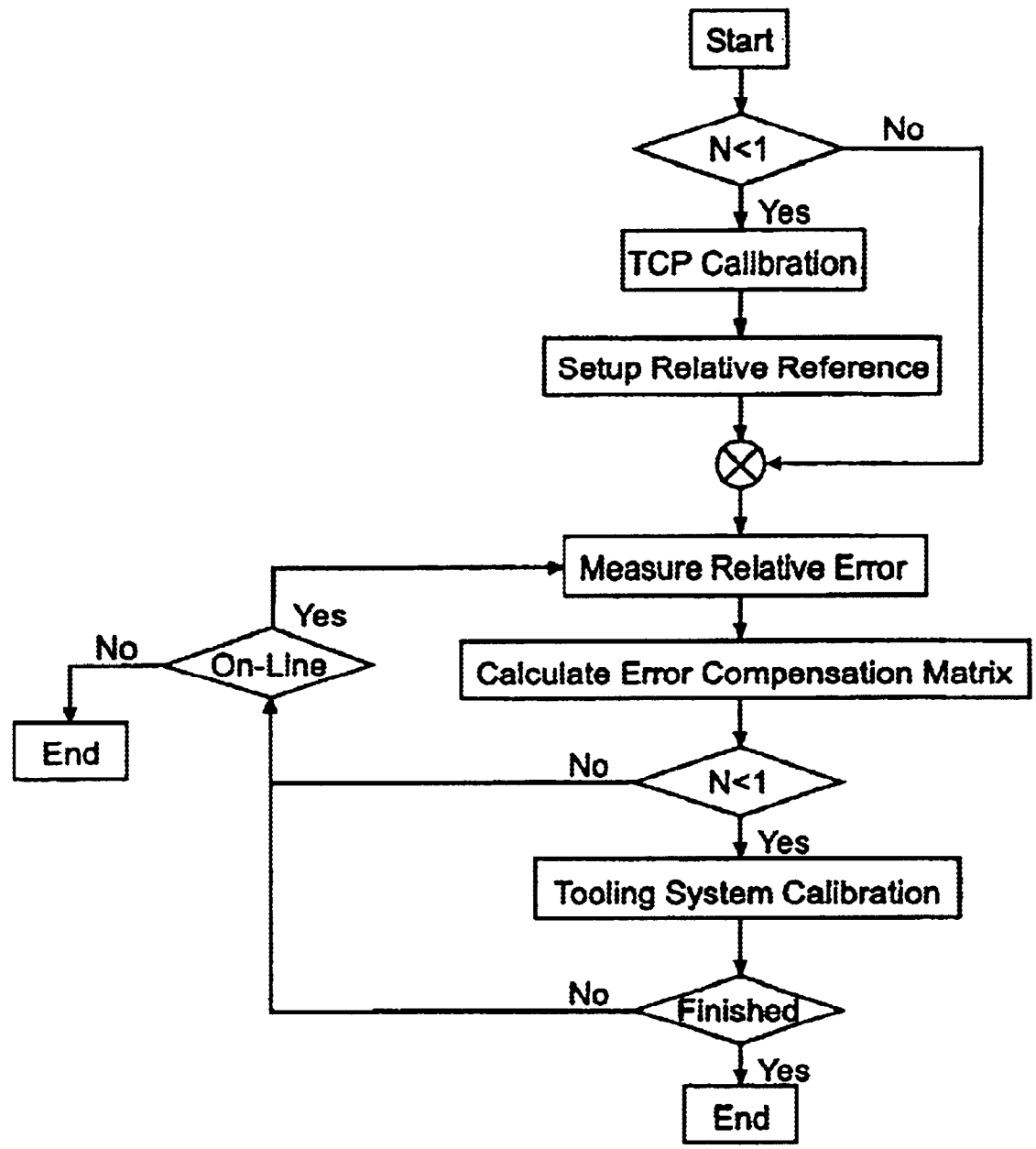
FIG. 4 is a flowchart showing the procedure of relative workcell calibration.

An overview of the relative workcell calibration is shown in the flow chart of FIG. 4.

Figure 5:
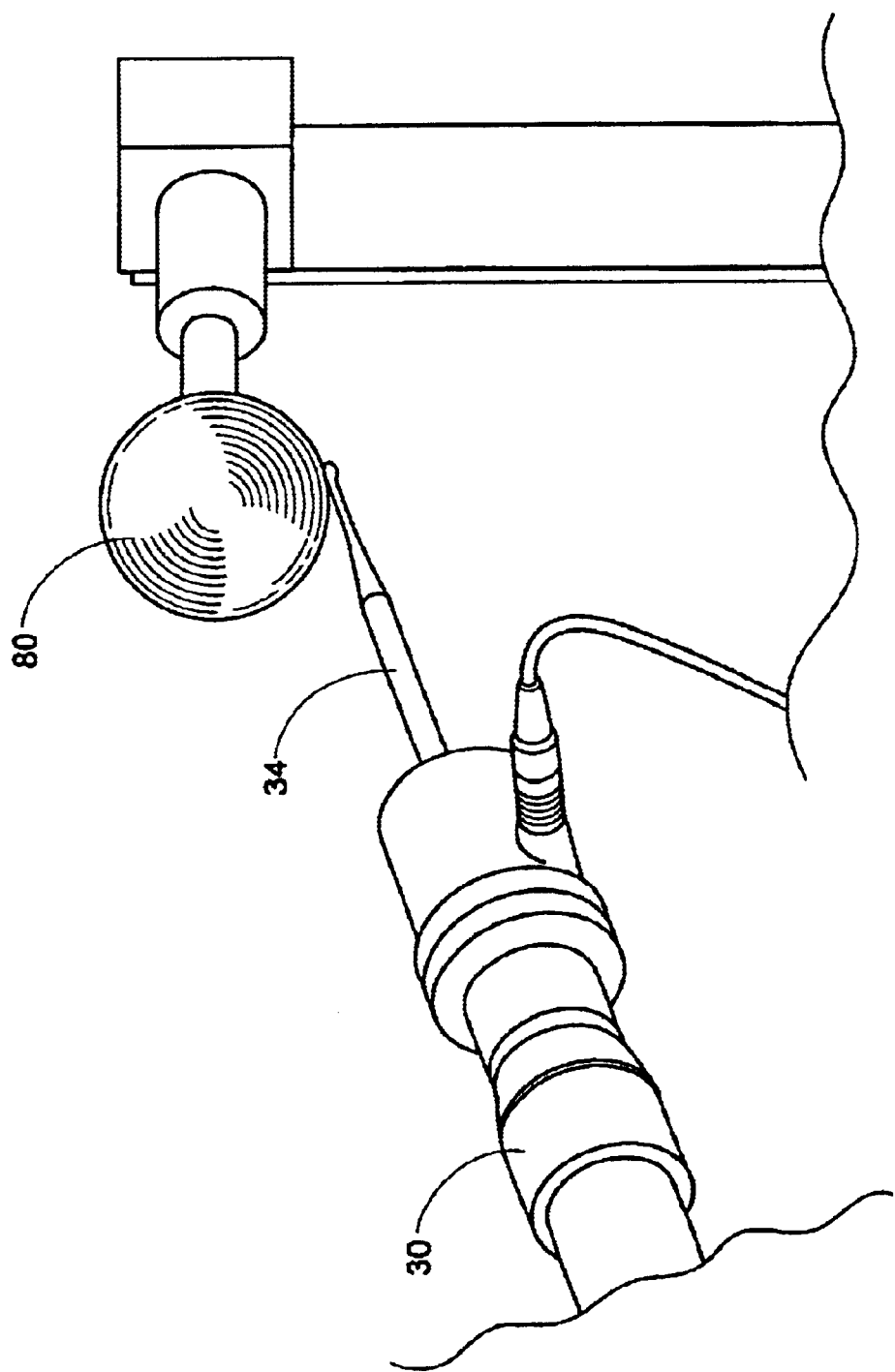
FIG. 5 is a perspective view of a CMM touch probe and calibration target.
Figure 6:
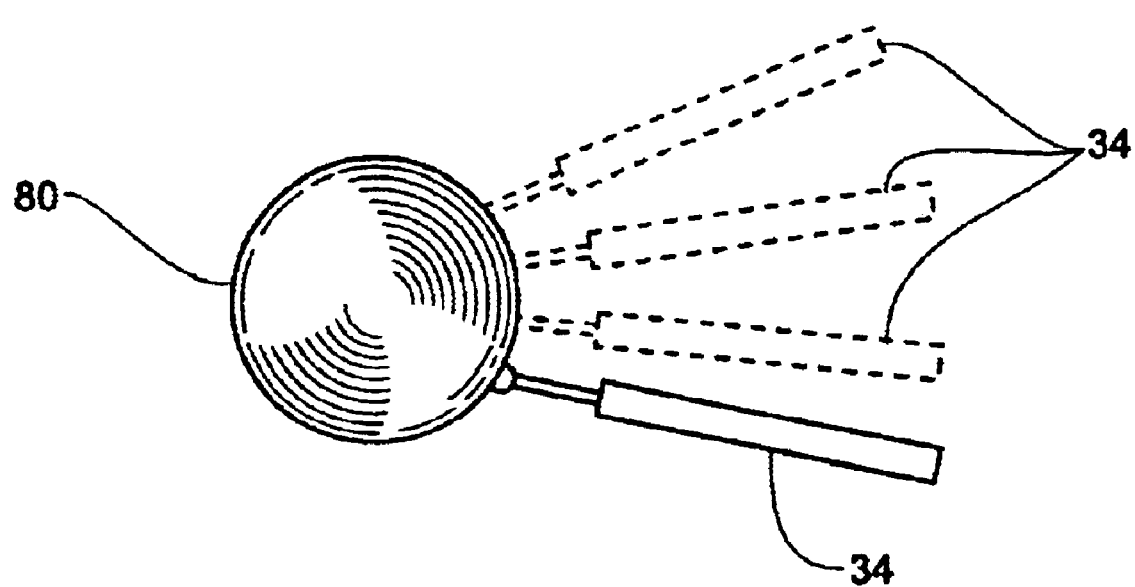
FIG. 6 is a diagrammatic view of a probe and calibration target.

The first step of the calibration process is tool center point (TCP) calibration. As shown in FIGS. 5 and 6, a calibration target 80 is mounted within the robotic workcell in a position that the robot 12 can reach from various angles. Calibration target 80 can be any geometric shape such as a sphere, cylinder, cubic, etc. A CMM touch probe 34 is placed in the robot gripper 30 or mounted to the end plate. The probe 34 makes multiple contacts with the calibration target 80 as shown in FIG. 6.

TCP calibration can be modeled as an optimization problem. Given a set of measurement data (robot position) and some constraints (geometry constraints), unknown parameters can be determined (robot center point on the mounting plate or gripper).

As shown in FIG. 6, given Yi and constraint f(Yi,a)=0, we must find a.

Yi=(xi, yi, zi) fits into the geometry model (for example sphere).

Constraint f(Yi,a) is built based on the calibration approach that depends on accuracy, cost, and calibration requirement.

Using a sphere model as the calibration reference target:

$$(xi-xo)^2+(yi-y0)^2+(zi-z0)^2=R^2 \quad (1)$$

Where R is known as the radius of the sphere and (xo, yo, zo) are unknown.

Each time contact is made, the measurements of robot position are recorded. At the end of the calibration cycle, the TCP of the touch probe is calculated.

There are numerous advantages of this method and apparatus for determining TCP. The traditional method of determining TCP consists of mounting a pointer to a fixed position within the robotic workcell and a second pointer to the robot end plate or gripper. The two pointers are then aligned to determine the TCP. Because it is necessary to achieve "point to point" alignment, the robot must be moved manually to align the pointers. This is a very slow process. Secondly, the operator must rely upon a visual inspection of the final pointer positions to insure that the TCP has been determined. The necessity of operator visual confirmation introduces potential error. The present method can be performed by simply programming the robot to touch the geometric shape at various or random points. Furthermore, there is no operator judgment required that could introduce error into the TCP determination.

Figure 7:
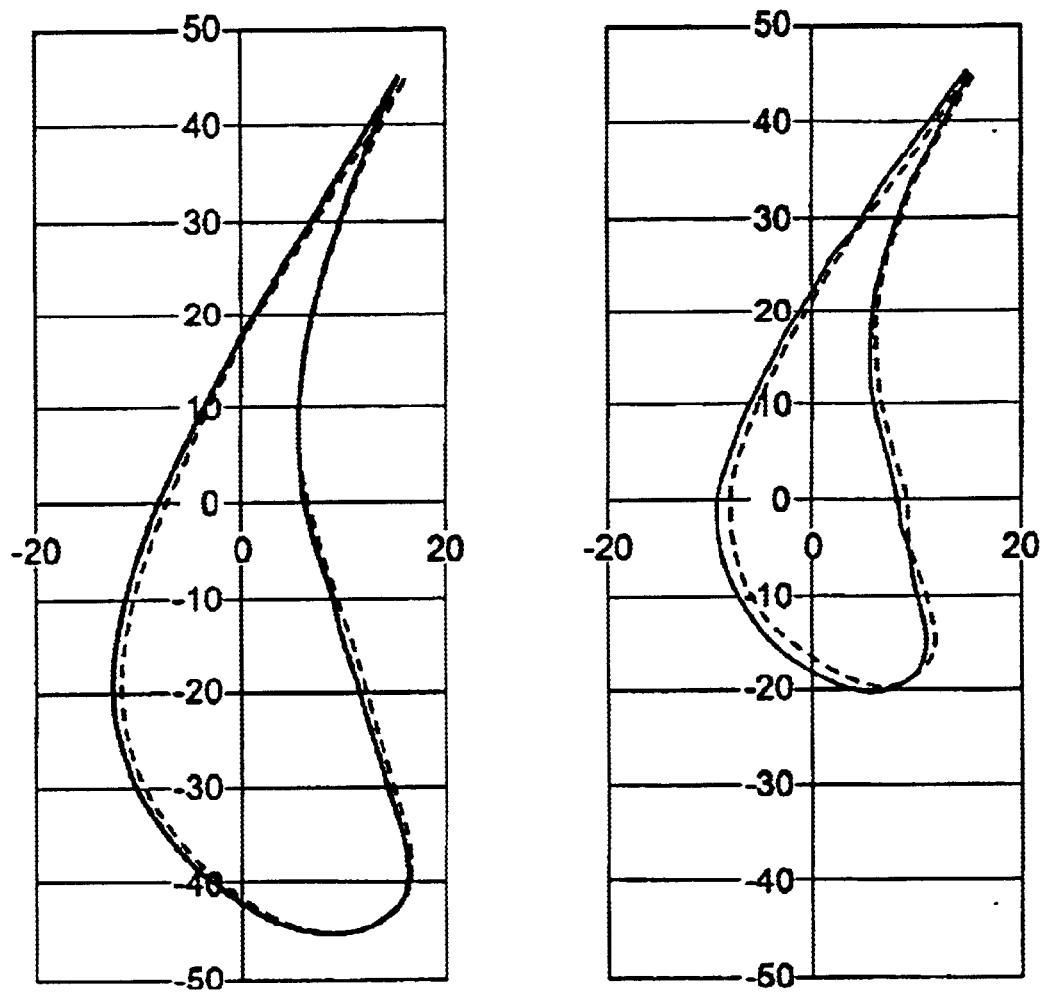
FIG. 7 is a graphical representation of a two-dimensional profile of an actual workpiece (in this instance a blade) and its computer aided design (CAD) model.

The next step is the relative reference setup. In an ideal environment, the CAD model of the working object is a perfect relative reference. However, in the real case, and as shown for an exemplary blade profile in FIG. 7, when the robot path goes through all target points along the workpiece surface and the calibration station sensor makes a measurement at target point, the relative error will not be zero. That means:

$$f(i)=rb(i)+rg(i)+gw(i) \quad (2)$$

Where rb(i) is manipulator error, rg(i) is gripper installation error and gw(i) is workpiece installation error.

The errors in equation 2 are regrouped into two separate groups. One is systematic error, which is a natural error from the robot 12. It also is a nonlinear error. The other group is the installation errors from the gripper and working-object. The installation errors can be added into one resulting error.

In this way, the relative error can be rewritten as:

$$\text{ref}(i)=\Delta\text{robot}(i)+\Delta\text{work-object frame}(i)+\epsilon \quad (3)$$

Where Δrobot(i) is the non-linear error mainly from robot manipulator and Δwork-object frame(i) is the sum of the installation errors from all of the rest of the components. This error can be transferred into the work-object coordinate, called the virtual work-object matrix. It can be seen that the in-process workcell calibration can be divided into two straightforward steps: the relative reference set up and the relative error calibration.

In this sense, the relative reference will be:

$$\text{Relative Reference}=f(x,y,z))+\Delta\text{robot}(i) \quad (4)$$

Where f(x,y,z) is the ideal model of the workpiece, usually the CAD model and Δrobot(i) is the error from the robot.

Thus the relative error will become:

$$\text{Relative Error}(i)=\Delta\text{work-object frame}(i)+\epsilon \quad (5)$$

Where ε is the random error from robot repeatability.

According to this principle, setting up the relative reference and measuring the relative error will be two major tasks in relative calibration. The detailed procedure of setting up the relative reference is as follows. First make a sample working-object as identical to CAD model as possible. Second, generate the calibration path on the surface of the sample-working object, simulating the path of robot operation in the simulation environment. Third, contact the robot 12 with the calibration sensor 52/54 and set to zero. In this way, a closed-form kinematic chain is formed. Fourth, move the robot 12 along the calibration path to measure the relative error using the calibration station 50. Fifth, add this error into the path generated from the CAD model to form a relative zero reference for the entire path.

The next step in the calibration process is relative error measurement. The sample working-object is removed and a real working-object or workpiece is installed in gripper 30. The robot 12 moves the real working object toward the calibration sensor 52/54 of the calibrations station 50. The sensor is set to zero when the working object surface touches the sensor 52/54.

Figure 8:
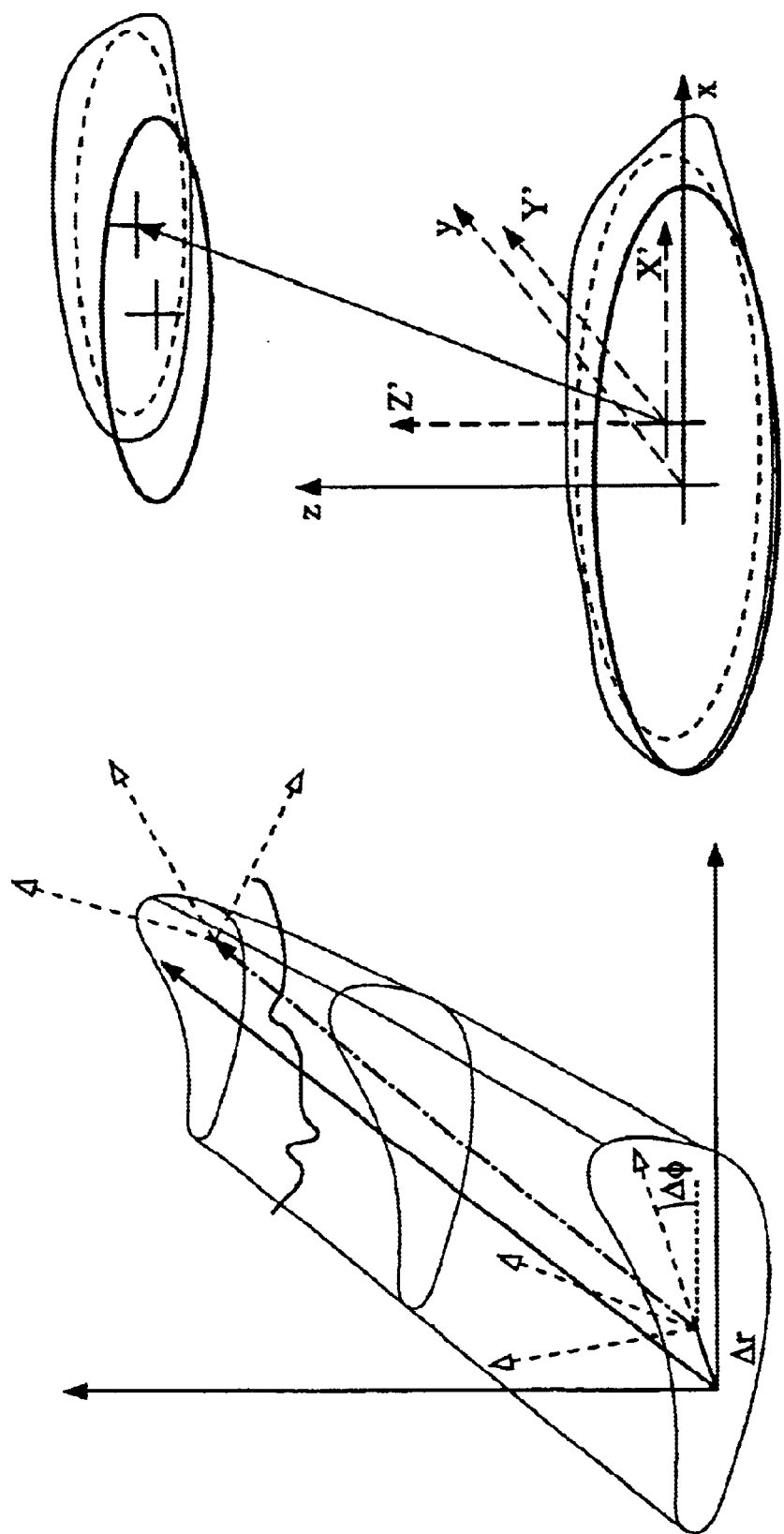
FIG. 8 is a graphical representation of the virtual work-object error model.

The measurement is designed to decouple the error matrix into two parts as $(\Delta x, \Delta y, \Delta\theta)$ and $(\Delta z, \Delta\alpha, \Delta\beta)$, where $(\Delta x, \Delta y, \Delta\theta)$ are the offset of work-object coordinate from the mounting plate 14 in the X-Y direction and $\Delta\theta$ is the orientation error around the Z-axis. In the second group $(\Delta z, \Delta\alpha, \Delta\beta)$, $\Delta z$ is the distance variation along the Z-direction and $\Delta\alpha, \Delta\beta$ are the orientation angle errors along the direction of pitch and yaw (see FIGS. 8 and 9).

The $(\Delta x, \Delta y, \Delta\theta)$ can be obtained by measuring the closed two-dimensional sectional workpiece profile. In order to get $(\Delta z, \Delta\alpha, \Delta\beta)$, multiple sections of the closed two-dimensional profile of measurements are needed and the displacement of the workpiece along the Z-axis needs to be measured too.

In the example described herein, it should be ensured that at least three sections on the surface along the z-direction are measured and one distance in z-direction is measured to get a complete data set for 6 degrees of freedom (DOF) information. It is important to record the data in a steady state in order to get stable and repeatable data.

The detail procedure is as follows. First, define the stand off points, which set up the relative zero when the kinematic chain is closed. This is also known as the relative zero point. Second, define the calibration path (i.e. define via points to go to from the stand off points). The calibration path will be designed to not only cover all 6 degrees of freedom (DOF) errors collection, but also to decouple $(\Delta x, \Delta y, \Delta\theta)$ and $(\Delta z, \Delta\alpha, \Delta\beta)$. Third, move the workpiece to a first standoff point and set up zero. Fourth, move to the calibration points along the designed paths. Fifth, record the true relative displacement from the calibration sensor 52/54. Finally, obtain the errors for all calibration points.

Figure 9:
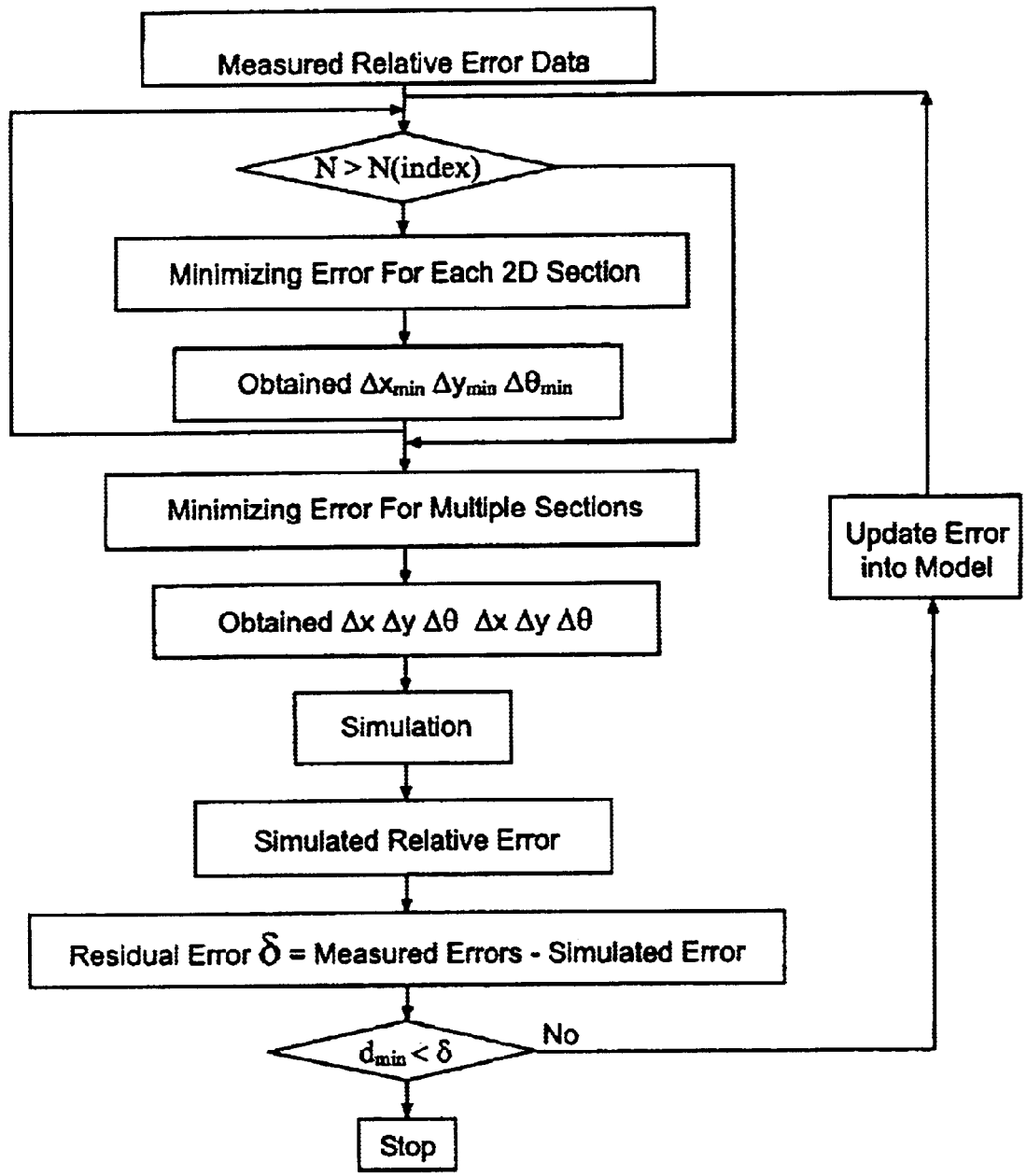
FIG. 9 is a flow chart showing two-stage optimization.

The fourth step is the calibration parameters (i.e. virtual work-object frame error-matrix) calculation. The calculation essentially becomes a two-stage non-linear optimization problem as shown in FIG. 9.

The first stage is to minimize the distance error between the true value and relative reference in one section of closed profile. The non-linear optimization problem consists of finding a set of $(\Delta x, \Delta y, \Delta\theta)$ to minimize:

$$D(i) = \text{Minimize}[(X(i)-f_x((\Delta x, \Delta y, \Delta\theta))^2 + [(Y(i)-f_y((\Delta x, \Delta y, \Delta\theta))^2 + [Z(i)-f_z((\Delta x, \Delta y, \Delta\theta))]^2) \quad (6)$$

Where $(X(i), Y(i), Z(i))$ are the coordinates for an ideal target, $f_x, f_y, f_z$ are the components of the true coordinate of $f((\Delta x, \Delta y, \Delta\theta)$ and $D(i)$ is the relative distance function.

As soon as optimal value $(\Delta x min, \Delta y min, \Delta\theta_{min})$ are obtained, the second optimization step is to find a set of $(\Delta z, \Delta a, \Delta\beta)$ to minimize:

$$\text{Sum of } (D(i)) = \text{Minimize}[(X(i) - f_x((\Delta xmin, \Delta ymin, \Delta\theta min, \Delta z, \Delta\alpha, \Delta\beta))]^2 + \quad (7)$$
$$[(Y(i) - f_y((\Delta xmin, \Delta ymin, \Delta\theta min, \Delta z, \Delta\alpha, \Delta\beta))]^2 +$$
$$[Z(i) - f_z((\Delta xmin, \Delta ymin, \Delta\theta min, \Delta z, \Delta\alpha, \Delta\beta))]^2)$$

Figure 10:
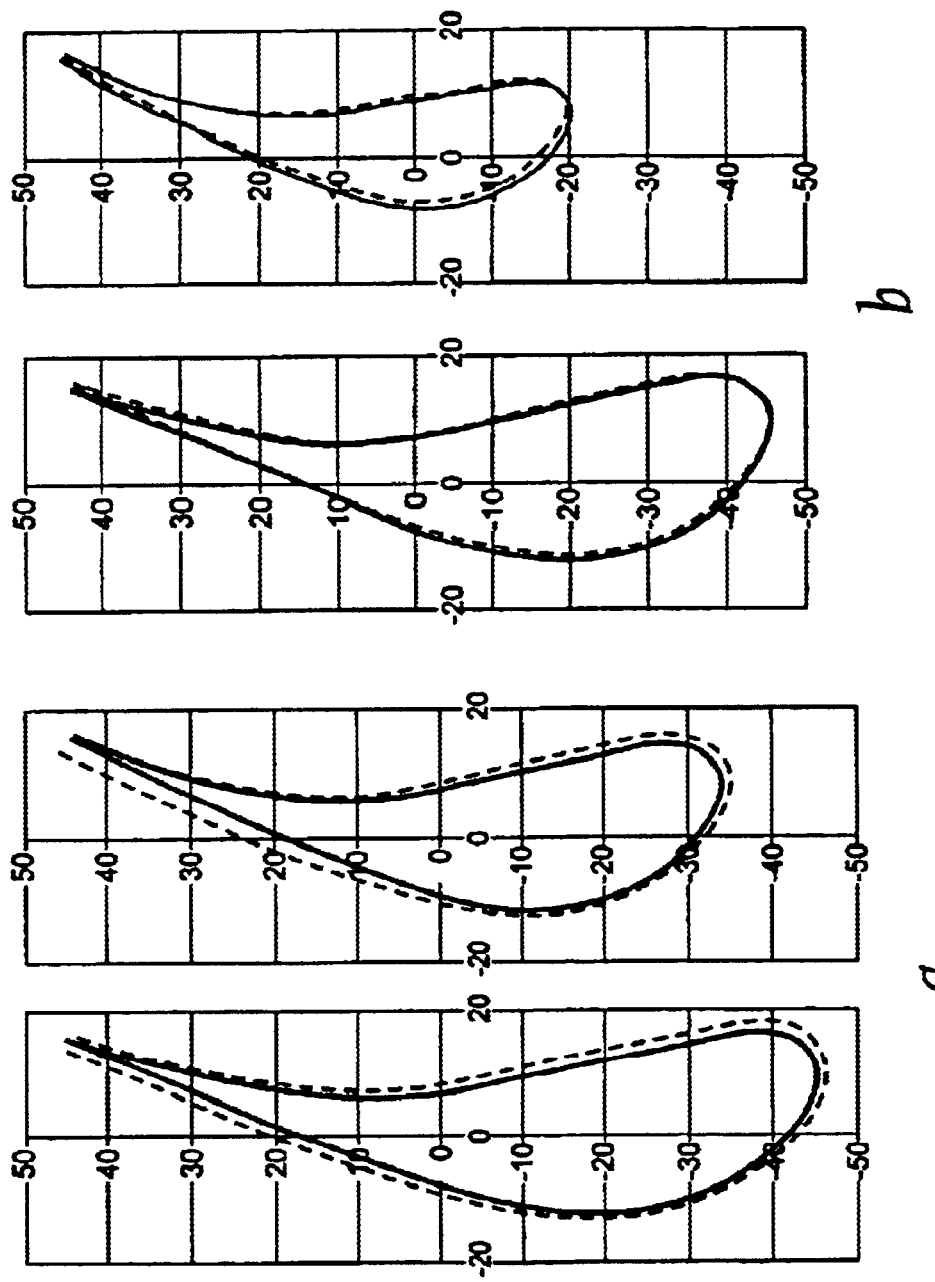
FIG. 10 depicts the measured relative error between a sample workpiece (again in this instance a blade) and an actual workpiece.

Iteratively repeat these two stages until all of the section errors are minimized as shown in FIG. 10b. By using each section data, $\Delta x, \Delta y, \Delta\theta$ will be obtained for each path. Next use the multiple sections data to to get $(\Delta x, \Delta y, \Delta\theta, \Delta\alpha, \Delta\beta)$. Then apply updated $(\Delta x, \Delta y, \Delta\theta, \Delta\alpha, \Delta\beta)$ to the simulation to get simulated offset for each targets along the paths. Next deduct offset from current offset to get the new offset, repeat the above algorithm to get a new $(\Delta x, \Delta y, \Delta\theta, \Delta\alpha, \Delta\beta)$. If new the $(\Delta x, \Delta y, \Delta\theta, \Delta\alpha, \Delta\beta)$ in step 4 is small enough, get out of the loop, otherwise, add the new $(\Delta x, \Delta y, \Delta\theta, \Delta\alpha, \Delta\beta)$ to the current $(\Delta x, \Delta y, \Delta\theta, \Delta\alpha, \Delta\beta)$, then repeat the above three steps. In this way, $(\Delta x, \Delta y, \Delta\theta, \Delta\alpha, \Delta\beta)$ will be obtained and the virtual work-object coordinate frame error matrix will be formed.

The final step is relative tool frame calibration. In the previous steps, the tooling system has not been involved because the calibration station 50 simulates the role of tooling system 40. Therefore it is now necessary to perform relative calibration between the tool 42 and the sensor 52/54 of the calibration device.

Figure 11:
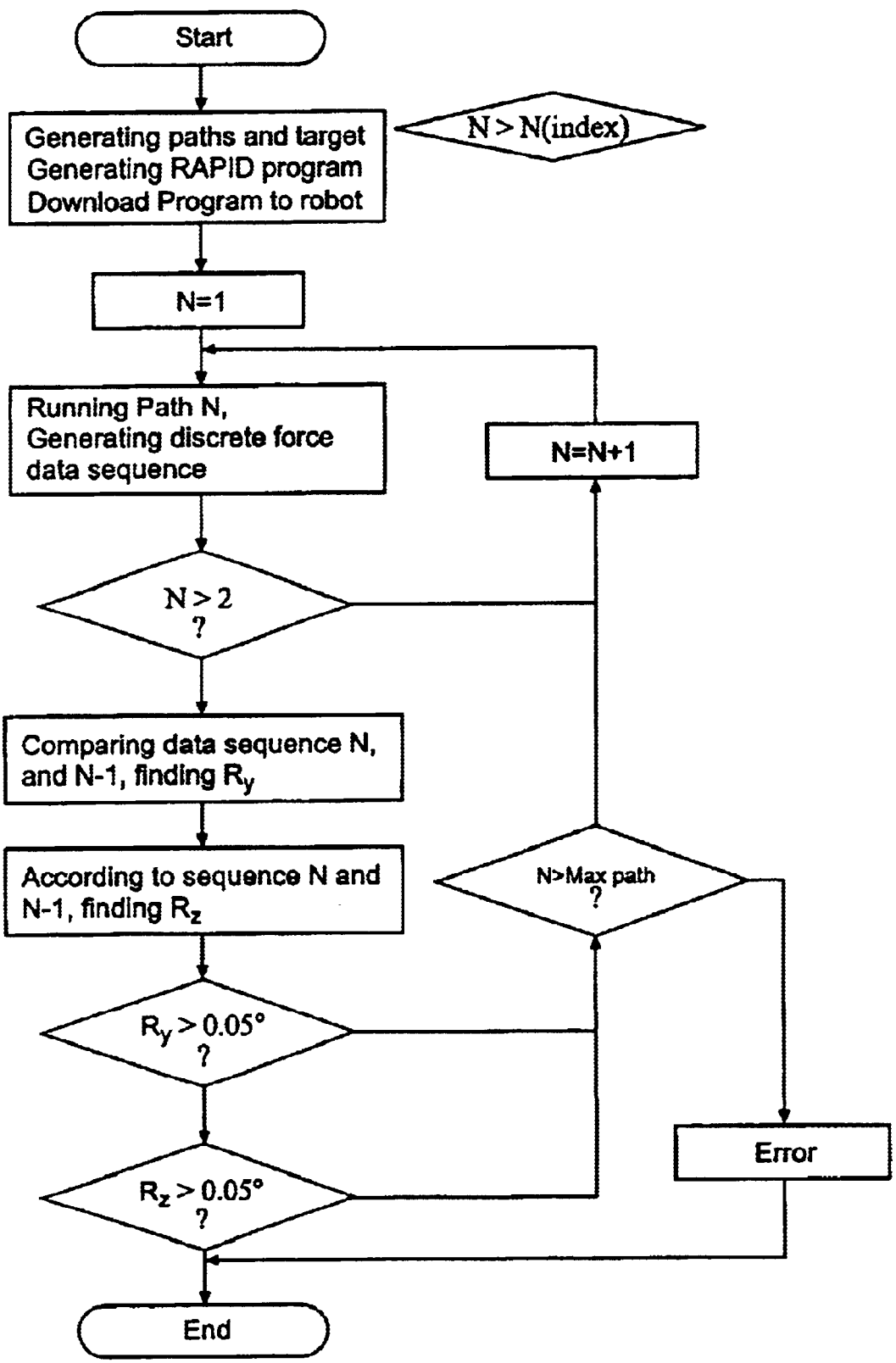
FIG. 11 is a flow chart showing tool calibration.

The steps in the tooling calibration are shown in the flowchart of FIG. 11. First, move the robot 12 to contact a point between the robot 12 and the tooling system 40. Run though the operation path to record the force utilizing force sensor 20 at each contact point and construct a stiff matrix for the force in 6 DOF. Based on the stiff matrix, which describes the relationship between the force and the incremental displacement of $(\Delta x, \Delta y, \Delta z)$, the displacement error matrix will be obtained. Convert this error matrix to normal and tangential decomposition respectively. The position and orientation of the tool will be obtained. The calibrated error will be compensated for the tooling coordinate system fixed TCP.

In the case that there is not an on-line force sensor 20 in the workcell, there is another way to accomplish tooling calibration. The robot 12 holds a linear gauge 52/54 to calibrate the orientation of the fixed tool center point, for example on the contact wheel 46 of the tooling system 40. By simply measuring the relative difference between any two points on the contact wheel, the orientation of the tool center point on the contact wheel can be calculated.

The above five steps will complete all of the workcell calibration and they are completed entirely off line.

Since the TCP calibration and tooling system calibration only needs to be completed once, the reference set up also only needs to be calibrated once for one type of application. Therefore, the on-line calibration requires only two steps. The two steps include online relative error measurement and calibration matrix calculation. Both of these steps can be performed in real-time, which is another advantage of this invention.

The detailed steps for online calibration are as follows. The robot 12, gripping a real workpiece 32, approaches the calibration station 50 to perform the on-line calibration. The gauge 52/54 is set to zero when the robot 12 moves to a first target on the workpiece 32. The offset between the programmed path and the real path is recorded at each of the corresponding target points on the workpiece 32. Graphically, this produces an output like that shown in FIG. 10a for a blade-type workpiece 32. The difference in the work-object coordinate system (i.e. gripper 30) between the real workcell and the CAD model is calculated by the recorded data. Finally, the calibration matrix for the work-object frame will be added into the work-object coordinate frame or virtual TCP.

What is claimed is:

1. In a robotic workcell having a robot, a sample workpiece, a calibration station and a tooling system, a method for off-line relative calibration comprising the steps of:

determining the tool center point of the robot;
   creating a relative reference between the robot and the sample workpiece;
   making relative measurements of the sample workpiece to calculate calibration parameters;
   calculating a work-object coordinate compensation matrix; and
   calibrating the tooling system, wherein calibrating the tooling system comprises measuring the relative difference between the fixed tool center point on the tooling system and the calibration station.

2. The method of claim 1 wherein determining the tool center point comprises the steps of:

selecting a calibration target having known geometric parameters;
   touching the target from random direction, at least two different directions to measure the variation from the known geometric parameters; and
   calculating the tool center point.

3. The method of claim 2 wherein the tool center point is calculated by non-linear least square optimization.

4. The method of claim 1 wherein creating the relative reference between the robot and the sample workpiece comprises the steps of:

grasping the sample workpiece;
   measuring the sample workpiece in a plurality of locations; and
   calculating the difference between a perfect model of the workpiece and the sample workpiece and adding all measured errors to the perfect model to construct a relative reference.

5. The method of claim 1 wherein generating the relative error map comprises the steps of:

measuring a two dimensional cross-section closed profile of the workpiece to determine errors in a X-Y plane for ($\Delta x$, $\Delta y$, $\Delta \theta$), where $\Delta \theta$ represents the direction of roll;
   measuring multiple two-dimensional cross-section closed profiles of the workpiece along a Z direction to determine errors in a Y-Z plane for ($\Delta z$, $\Delta \alpha$, $\Delta \beta$), where ($\Delta \alpha$, $\Delta \beta$) represent the direction of yaw and pitch.

6. The method of claim 1 wherein calculating a work-object coordinate compensation matrix comprises the steps of:

optimizing an offset and orientation along the workpiece in a first plane;
   optimizing an offset and orientation along the workpiece in a second plane;
   iteratively repeating the first and second steps until all relative errors are minimized.

7. The method of claim 1 wherein calibrating the tooling system comprises the steps of:

touching the robot to the tooling at a first location and recording the robot position;
   touching the robot to the tooling at a second location and recording the robot position;
   calculating the relative difference between the robot TCP and a parameter defined by the first and second locations.

8. In a robotic workcell having a robot, a sample workpiece, a calibration station and a tooling system, a method for off-line relative calibration comprising the steps of:

determining the tool center point of the robot;
   creating a relative reference between the robot and the sample workpiece;
   making relative measurements of the sample workpiece to calculate calibration parameters;
   calculating a work-object coordinate compensation matrix; and
   calibrating the tooling system, wherein calibrating the tooling system comprises
      moving the robot to a first contact point between the robot and the tooling system;
      recording the force between the robot and tooling system;
      repeating the above procedure until only a substantially normal force is generated;
      transferring and calculating the residual error between the robot and the tooling system by converting force error components into position variation; and
      calculating the error-compensation matrix and adding into a tooling coordinate frame.

9. A method for calibration of a robotic workcell including a robot, a sample finished workpiece, a calibration station, and a tooling system, the method comprising:

making reference measurements of the sample finished workpiece in the calibration station;
   making reference measurements of a raw unfinished workpiece in the calibration station;
   performing a comparison of the reference measurements of the sample finished with the reference measurements of the raw unfinished workpiece; and
   calculating a work-object error compensation matrix based upon the comparison.

10. A method for relative calibration of a robot work cell, the robot work cell comprising a robot, a sample workpiece, a tooling system, a force sensor and a calibration station including a displacement measurement sensor, the method comprising:

tool calibration;
   workobject calibration comprising
      programming calibration paths on a surface of the sample workpiece to define calibration movements for the measurement of workobject surface positions relative to the displacement measurement sensor,
      defining a workobject geometry in a cartesian coordinate system with orthogonal x-, y-, and z-axes, in which the workobject can be translated dx, dy and dz and rotated dRx, dRy and dRz,
      obtaining the calibration paths from a reference position of the workpiece relative to a robot mounting plate and from closed two-dimensional cross sectional workpiece profiles in parallel xy-planes,
      calibrating dz by measuring a relative distance between the reference position of workpiece and the robot mounting plate, after running calibration paths, utilizing one dimensional displacement measurements from the calibration station to calculate relative errors dx, dy and dRz of an actual workpiece profile relative to a corresponding ideal workpiece profile, calculating errors in dRx and dRy based upon the distance between the workpiece profiles and at least two sets of dx, dy and dRz, calculating dx, dy,dz,dRx,dRy, dRz for the workobject, moving the robot to approach and touch the tool;

performing tool calibration using a force sensor mounted on arms of the robot; and calculating a tool coordinate relative to the calibrated workobject.

* * * * *